(12) United States Patent
Nemiroff et al.

(10) Patent No.: US 11,057,653 B2
(45) Date of Patent: Jul. 6, 2021

(54) JITTER MANAGEMENT IN A STATISTICAL MULTIPLEXER EMPLOYING AN IP NETWORK

(71) Applicant: ARRIS Enterprises LLC, Suwanee, GA (US)

(72) Inventors: Robert S. Nemiroff, Carlsbad, CA (US); Jing Yang Chen, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/228,993

(22) Filed: Dec. 21, 2018

(65) Prior Publication Data

US 2020/0204840 A1    Jun. 25, 2020

(51) Int. Cl.
*H04N 21/2365* (2011.01)
*H04N 21/242* (2011.01)
*H04L 29/06* (2006.01)
*H04N 19/177* (2014.01)
*H04N 21/6373* (2011.01)

(52) U.S. Cl.
CPC ..... *H04N 21/23655* (2013.01); *H04L 65/607* (2013.01); *H04L 65/80* (2013.01); *H04N 19/177* (2014.11); *H04N 21/242* (2013.01); *H04N 21/6373* (2013.01)

(58) Field of Classification Search
CPC .......... H04N 21/23655; H04N 21/242; H04N 21/6373; H04N 19/177; H04L 65/80; H04L 65/607
See application file for complete search history.

(56) References Cited

U.S. PATENT DOCUMENTS

| 6,731,685 | B1 | 5/2004 | Liu | |
|---|---|---|---|---|
| 7,526,001 | B2 | 4/2009 | Sanders | |
| 7,843,824 | B2 | 11/2010 | Wu | |
| 2012/0051420 | A1 | 3/2012 | Chen | |
| 2013/0070839 | A1 | 3/2013 | Magee | |
| 2016/0182976 | A1* | 6/2016 | Kwon | G11B 27/10 725/118 |
| 2016/0241890 | A1* | 8/2016 | Park | H04N 21/20 |

* cited by examiner

*Primary Examiner* — Jianye Wu
(74) *Attorney, Agent, or Firm* — Chernoff, Vilhauer, McClung & Stenzel, LLP

(57) ABSTRACT

A statistical multiplexer is provided with a series of encoders that encode media streams at different bitrates to reduce jitter. The encoded media streams are transmitted to a multiplexer over a network and experience jitter that is reduced by a de-jitter arrangement. The multiplexer rearranges a transmit time of select packets in select ones of the media streams received over the network when a total group bandwidth available on the transmission channel over which the multiplexed media stream is to be transmitted is less than a sum of the bandwidths of the media streams because of the jitter and de-jitter process experienced by the media streams. The rearranging causes the bandwidth of the multiplexed media stream to be no greater than the total group bandwidth of the transmission channel without exceeding a maximum bit rate at which each individual encoded media stream is configured.

20 Claims, 4 Drawing Sheets

JITTER MANAGEMENT IN A STATISTICAL MULTIPLEXER EMPLOYING AN IP NETWORK

BACKGROUND

Multiple programs are known to be encoded and sent over a common channel having a fixed limited bandwidth using a technique known as statistical multiplexing. Statistical multiplexing is a type of communication link sharing in which a communication channel is typically divided into an arbitrary number of digital channels or data streams. The multiple programs may be statistically multiplexed using a multiplexer (often referred to as a STAT MUX), a rate controller and a plurality of encoders. The communication channel is known to have a bandwidth limitation. Because the multiple programs often have a variable bit rate (VBR) and the communication channel has a bandwidth limitation, bit distribution over the multiple programs is known to be problematic.

The multiplexer may change transmission bit rates upon requests from the encoders through a need parameter, minimum bit rate request, and a maximum bit rate request. This need parameter indicates the relative complexity of the video sequence. The minimum bit rate request informs a rate controller of a lowest rate at which video may be sent that allows receipt of complete frames at a decoder prior to decoding. The maximum bit rate informs the rate controller of a highest rate at which video may be sent to the decoder. The encoders retain all encoding bit rates received in the past predetermined delay and uses this information to calculate a target frame size and an initial quantization parameter (QP) level for each frame to be encoded. As soon as an encoder finishes encoding a frame, the encoder updates a current need parameter. The encoders also use a current transmission bit rate to regulate the amount of bits transferred to the multiplexer and update the minimum bit rate request and the maximum bit rate request at each interrupt. An interrupt is triggered as soon as a bit rate information message arrives at the encoder.

Each encoder calculates the need parameter based on the complexities of past encoded frames and look-ahead activities of the incoming frames. The complexity of a past encoded frame is defined by the product of the bits used for this frame and the average quantizer for this frame. The multiplexer allocates more bits (bandwidth) for the encoders having video input of higher complexity while maintaining the constant group bandwidth.

Transport Packet transfer from the encoders to the multiplexer in statistical multiplexer systems have typically employed the Asynchronous Serial Interface (ASI) standard. More recently, however, statistical multiplexing systems have begun to employ Internet Protocol (IP) standards for communication between the encoders and the multiplexer. While ASI does not give rise to packet jitter, packet jitter does occur when IP communication is employed.

SUMMARY

In accordance with one aspect of the subject matter described herein, a method is provided for multiplexing encoded media streams into a statistically multiplexed media stream. In accordance with the method, a plurality of encoded media streams is received over a communication network. Each encoded media stream has a variable bit rate (VBR). The encoded media streams experience jitter while being transmitted over the communication network and undergoing a de-jitter process. Prior to multiplexing the encoded media streams into a multiplexed media stream, a transmit time of select packets in select ones of the encoded media streams are rearranged when a total group bandwidth available on a transmission channel over which the multiplexed media stream is to be transmitted is less than a sum of bandwidths of the encoded media streams because of the jitter and de jitter process experienced by the media streams. The rearranging is performed without exceeding a maximum bit rate at which each individual encoded media stream is configured. The rearranging causes the bandwidth of the multiplexed media stream to be less than or equal to the total group bandwidth of the transmission channel. After rearranging the transmit time of the select packets, the encoded media steams are multiplexed into the multiplexed media stream and transmitted onto the transmission channel.

In accordance with another aspect of the subject matter described herein, a statistical multiplexer includes a plurality of encoders, a multiplexer, a communications network, a rate control processor and a de-jitter arrangement. Each of the encoders are configured to encode media streams at different bitrates. Each of the media streams have associated therewith one or more need parameters reflecting a bit rate needed to transmit the respective media stream over a network at a given quality level. The multiplexer multiplexes each of the media streams to form a multiplexed media stream. The communications network transmits the media streams from the encoders to the multiplexer. The communications network conforms to a communication protocol that gives rise to packet jitter that is experienced by packets in the media streams. The rate control processor allocates bandwidth to each of the media streams based at least in part on the need parameter associated therewith so that a sum of bandwidths respectively allocated to the media streams is less than or equal to an available bandwidth on a transmission channel over which the multiplexer transmits the multiplexed media streams. The de jitter arrangement reduces the packet jitter experienced by packets in the media streams being transmitted over the communication network to the multiplexer. The multiplexer includes a processor and one or more computer readable media. The one or more computer readable media include instructions that, when executed by the processor, rearranges a transmit time of select packets in select ones of the media streams received over the communications network when a total group bandwidth available on the transmission channel over which the multiplexed media stream is to be transmitted is less than a sum of the bandwidths of the media streams because of the jitter and de-jitter process experienced by the media streams. The rearranging causes the bandwidth of the multiplexed media stream to be no greater than the total group bandwidth of the transmission channel without exceeding a maximum bit rate at which each individual media stream is configured.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
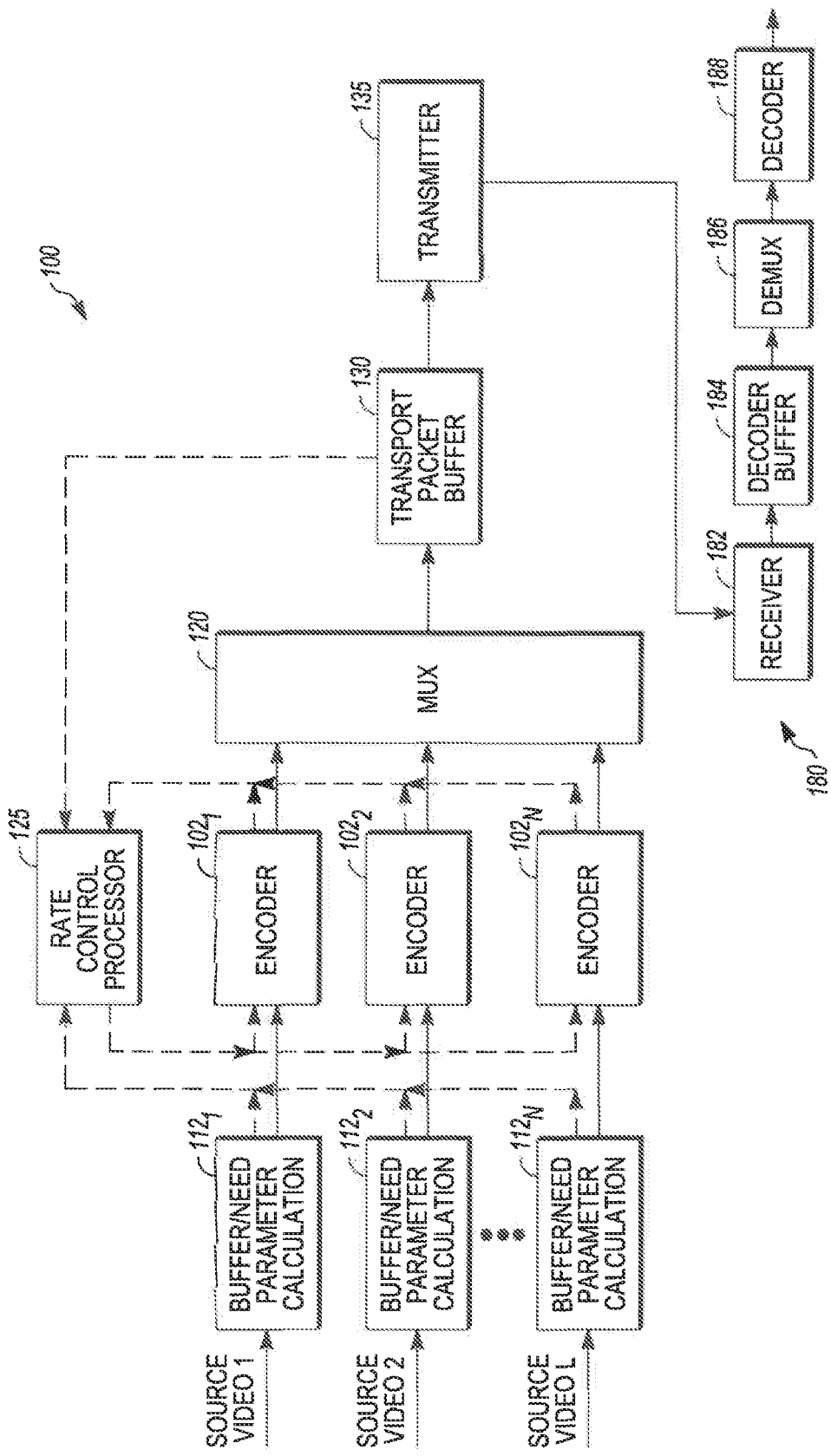
FIG. 1 illustrates one example of a statistical multiplexing system.

FIG. 1 illustrates one example of a statistical multiplexing system. The system 100 includes buffer/need parameter calculation functions $112_1$-$112_n$ that receive corresponding uncompressed source video inputs having varying levels of complexity. The functions $112_1$-$112_n$ provide the need parameter data to a rate control processor 125, which in turn provides a corresponding encoding bit rate allocation to each of the encoders $102_1$-$102_n$. The encoders may provide feedback information to the rate control processor 125 regarding the actual encoding bit rate. The encoders $102_1$-$102_n$ encode the bits contained in the source data to form a plurality of corresponding variable bit rate (VBR) media streams using bandwidth allocated by the rate control processor 125. The encoders $102_1$-$102_n$ may encode the source data using any suitable encoding technique, such as, Moving Picture Experts Group (MPEG) encoding standards including MPEG-4 part 10, which is also referred to as MPEG-4 AVC (Advanced Video Coding), and MPEG-2.

The media streams are provided by the encoders $102_1$-$102_n$ to a multiplexer 120. The multiplexer 120 thereafter multiplexes the plurality of media streams received from the encoders $102_1$-$102_n$ to form a single multiplexed transport stream 120, for instance, a constant bit rate (CBR) transport stream. The bit rate of the multiplexed transport stream 120 may be determined by, for instance, by the available bandwidth on the channel over which the transport stream to be transmitted. The multiplexer 120 includes or is associated with a transport packet buffer 130 and a transmitter 135 for transmitting the transport stream across a transmission channel. The rate control processor 125 may receive a fullness signal from the transport packet buffer 130.

At a decoding side 180, a receiver 182, decoder buffer 184, demultiplexer 186, and decoder 188 are provided to output a decoded video signal, e.g., for display on a display device such as a television. It should be understood that the statistical multiplexing system 100 depicted in FIG. 1 may include additional components and that some of the components described herein may be removed and/or modified without departing from the scope of the statistical multiplexing system 100.

The rate control processor 125 is configured to generate a periodic interrupt during which an interrupt service routine is performed, at a predetermined time interval, such as, for instance, approximately 848 microseconds. During the interrupt service routine, the rate control processor 125 receives a need parameter message from each of the buffer/need parameter calculation functions $112_1$-$112_n$. The need parameter message includes a current need parameter, a minimum bit rate request, and a maximum bit rate request for each of the encoders $102_1$-$102_n$. The current need parameter for an encoder $102_1$ is based upon a complexity level of the source data to be encoded by that encoder $102_1$. The rate control processor 125 uses the information contained in the need parameter message to allocate encoding bit rates and the transmission bit rates for each of the encoders $102_1$-$102_n$. In this way the rate control processor 125 can ensure that the sum of the bandwidths of the media streams generated by the encoders is less than or equal to the total group bandwidth available on the transmission channel onto which the combined media streams are transmitted by the multiplexer 120 to the receiver 182.

Figure 2:
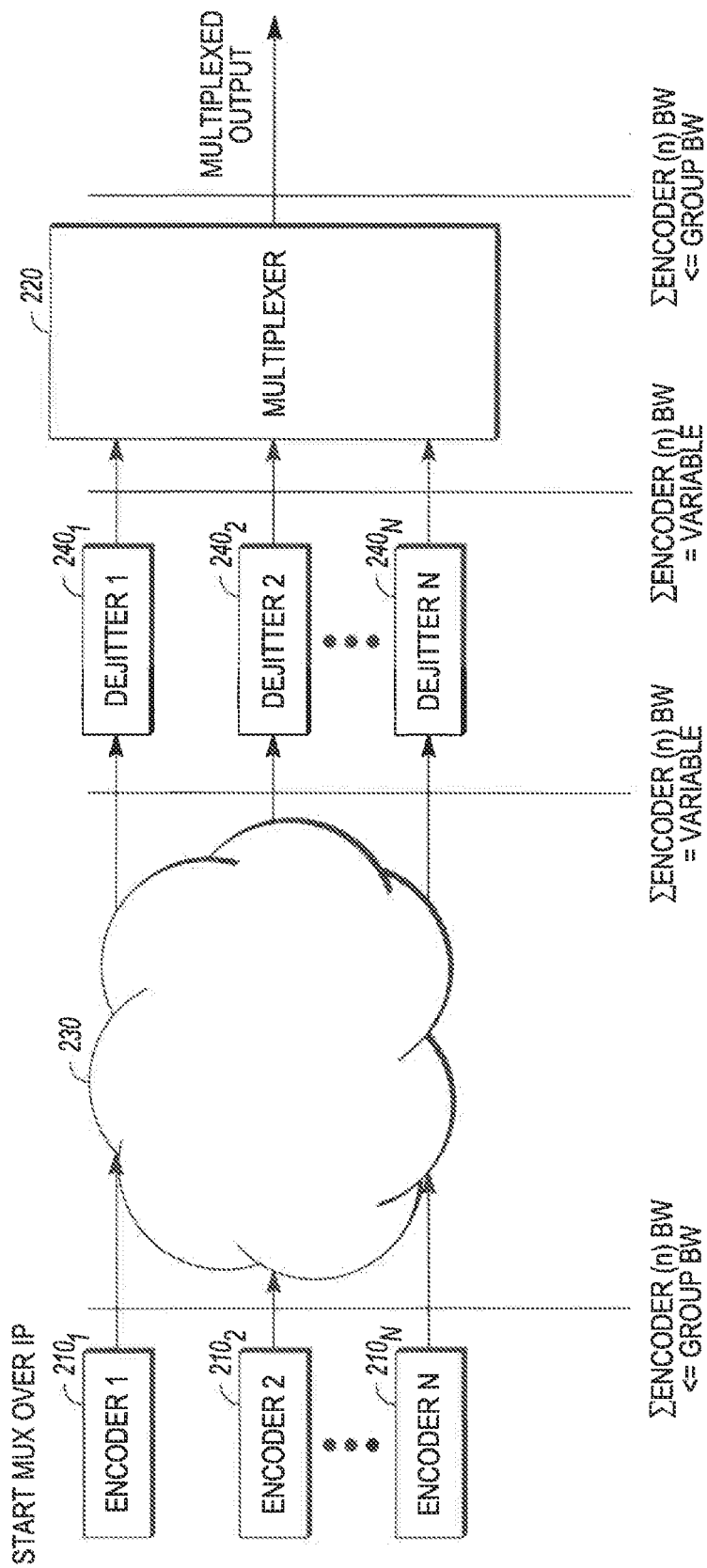
FIG. 2 shows the encoders and the multiplexer of a statistical multiplexing system, which are in communication with one another over a network that employs an IP protocol.

The interface employed between the encoders, rate control processor and the multiplexer may be an Internet protocol interface. As a consequence, the packets in the transport stream experience jitter. To reduce the jitter of each media stream from each encoder the multiplexer employs de-jitter functionality that may be accomplished using, for example, a phase-locked loop (PLL). This is illustrated in FIG. 2, which shows encoders $210_1$-$210_n$ in communication with multiplexer 220 over a network 230 that employs an IP protocol. Also shown is the de-jitter functionality $240_1$-$240_n$ that reduces the jitter of each media stream from the encoders $210_1$-$201_n$ before they are multiplexed by the multiplexer 220. The PLLs that are used to reduce jitter also produce a variable delay between their inputs and outputs, which is caused by the tracking speed of the PLLs. As explained below, the jitter can occasionally cause the bandwidth of the multiplexed media stream to exceed the bandwidth of the channel over which the multiplexed media stream is transmitted.

In the context of MPEG, a video stream is encoded as a series of sequences. Each sequence is divided into groups of pictures ("GOPs") and each GOP contains a series of encoded I, B and P video frames. Each sequence includes a sequence header, each GOP includes a GOP header and each frame includes a frame header. Each sequence also includes program clock references (PCRs). In addition, each data stream is transmitted as a contiguous series of packets, with each packet having a packet header. Each MPEG-2 encoded video frame further includes, in addition to video data and a frame type field (i.e., an I, B or P frame), timing and relative ordering information. The frame timing information includes (for each frame) a decode time stamp or "DTS" field, (which indicates the time at which a received frame is to be decoded), and a corresponding presentation time stamp or "PTS" field (which indicates the time at which the decoded frame will be presented for display). The two different timestamps, PTS and DTS, are needed because P frames cannot be decoded if the decoder has not yet decoded the previous frames and B frames need future I frames or P frames before the B frames can be decoded.

The PCR is a timestamp that is inserted by each encoder into the content stream as a clock recovery mechanism. When a program is encoded, a system time clock in the encoder drives the encoding process. In the MPEG encoding standard, for instance, the system time clock operates at 27 MHz. When the program is decoded, it needs to be driven by a clock which is locked to the system time clock of the encoder. The decoder uses the PCR to regenerate a local clock. In particular, the decoder typically uses a voltage controlled oscillator to generate the local clock. When a PCR is received, it is compared to a local counter that is driven by the oscillator and the difference is used to correct the frequency of the oscillator to ensure that the local clock is locked to the system time clock of the encoder.

The jitter introduced by the IP network along with the de-jitter functionality of the PLL causes a variable delay of the packets between the time that the packets in the stream are generated in the encoder and the time the multiplexor has that stream ready after PCR recovery.

The sum of the bandwidths of the media streams generated at the encoders before being transmitted over the IP network must be equal to or less than the total group bandwidth available on the communication channel onto which the combined media streams are transmitted by the multiplexer. However, as indicated in FIG. 2, because of the variable delay experienced by each media stream as a result of jitter, the sum of the bandwidths of the media streams after traversing the communication network 230 and undergoing de-jitter may vary and thus may sometimes exceed the available group bandwidth. Because of this the total bandwidth of the multiplexed transport stream from the multiplexer may sometimes overflow.

The total bandwidth of the multiplexed transport stream can be prevented from overflowing if the packets in some of the individual media streams are delayed when the bandwidth sum of the media streams is greater than the group bandwidth. This will cause the decode time of the delayed packed also to be delayed. However, if the decode time is delayed by too much, it will cause an underflow and a video glitch at the decoded output because each frame must arrive at the decoder before the time specified by its DTS.

This problem can be resolved by comparing the decode delay of the next packet in each content stream that is scheduled to be transmitted by the multiplexer and selecting for transmission as the next packet the packet from the content stream which has the shortest decode delay. The decode delay of a packet is the difference between the current PCR time at the multiplexer and the DTS time of the packets within the frame currently being transmitted. This rearranges the actual transmit time of the packets within the content streams and prioritizes those packets that need to arrive earliest at their respective decoders. In this way the packets are more likely to arrive at the decoder in time for each frame to be decoded at the proper DTS time. Of course, the rearrangement of the transmit times should ensure that the maximum bit rate specified for each individual media stream is not exceeded.

As a consequence of rearranging the transmit time of the packets in this way, the packets are no longer transmitted by the multiplexer with the same timing that they arrived at the multiplexer. This will impact the timing of the PCRs that are being transmitted since PCRs are not included in every packet but only in packets separated in time by a predetermined maximum interval (such as 40 ms for the ATSC standard and 100 ms for MPEG standard). By rearranging the transmission sequence of the packets in the transport stream transmitted by the multiplexer, this maximum interval may be exceeded. To prevent this the multiplexer can track the PCR transmission time interval for each content stream and if the maximum interval will be exceeded as a result of the packet rearrangement, a PCR packet (i.e., a packet with an embedded PCR timestamp but no data payload) can be sent. Before sending the PCR packet the multiplexer will check if the next packet for that content includes the PCR, and if so it will transmit that packet immediately. If it does not contain a PCR, then the additional PCR packet is sent.

In addition to ensuring that the maximum the PCR transmission time interval is not exceeded for each content stream, the multiplexer will also modify the PCR to its correct value based on packet placement, a technique which is well known as PCR correction.

Figure 3:
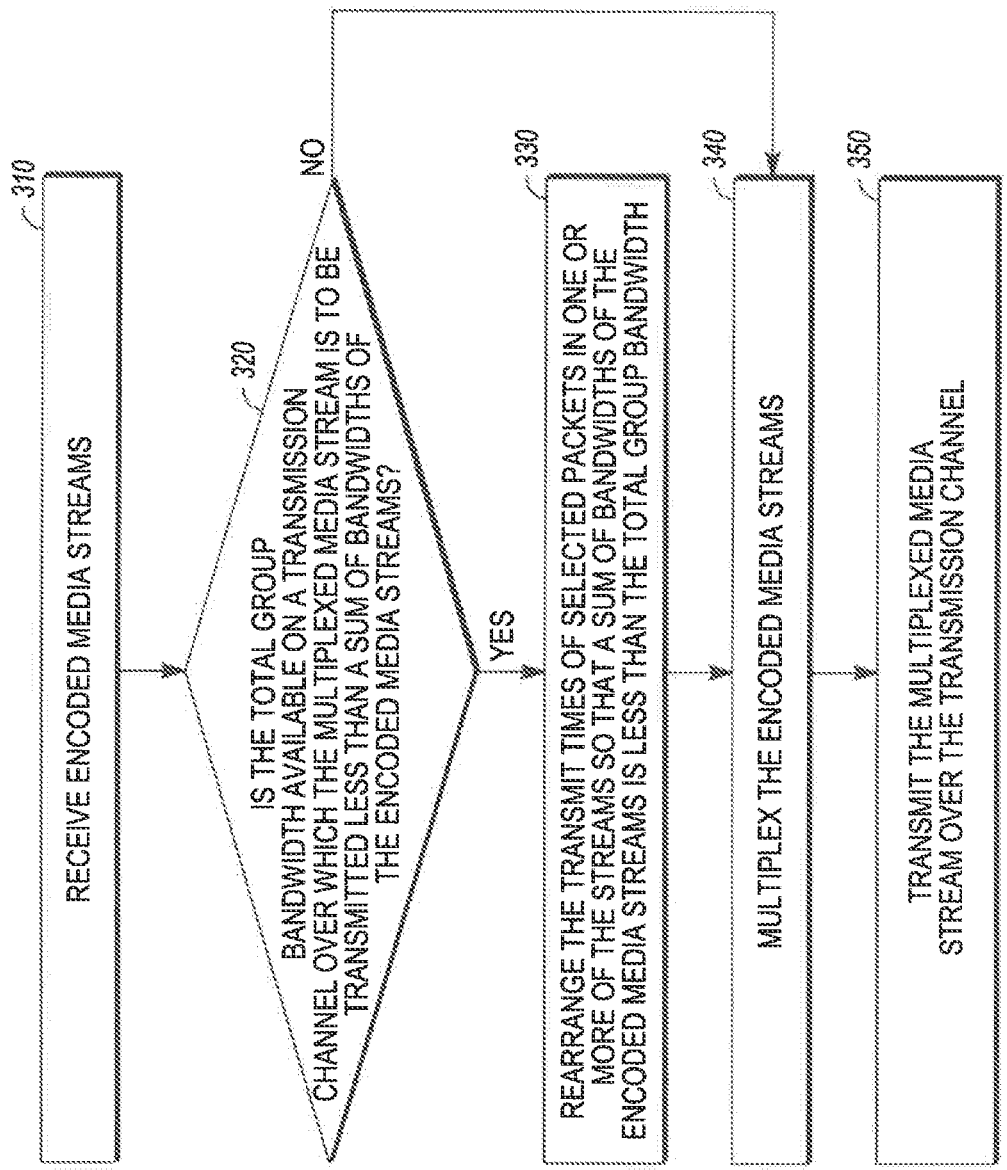
FIG. 3 is a flowchart showing one example of a method for transmitting a statistically multiplexed media stream from a statistical multiplexer in which the packets in the media streams experience jitter between the encoders and the multiplexer.

FIG. 3 is a flowchart showing one example of a method for transmitting a statistically multiplexed media stream from a statistical multiplexer in which the packets in the media streams experience jitter between the encoders and the multiplexer. At step 310 a plurality of encoded media streams are received by a multiplexer from encoders over a communication network. The media streams, which each have a variable bit rate (VBR), experience jitter while being transmitted over the communication network and undergo a de-jitter process before being multiplexed. In step 320, prior to multiplexing the encoded media streams, the sum of the bandwidths of the encoded media streams is monitored to determine if the bandwidth of the transmission channel over which the multiplexed media steam will be sent is less than the sum of the bandwidth of the sum of the encoded media streams. If so, then the transmit time of select packets in select ones of the encoded media streams are rearranged in step 330 so that the bandwidth of the multiplexed media stream is less than or equal to the total group bandwidth of the transmission channel. After rearranging the transmit time of the select packets, if needed, the encoded media steams are multiplexed at step 340 into the multiplexed media stream and transmitted onto the transmission channel at step 350.

In some embodiments the transmit time of the select packets are rearranged by prioritizing transmission of certain packets over other packets based at least in part on a decode transmit time (DTS) associated with the packets. More specifically, in some cases the select packets having rearranged transmit times include a prioritized packet that is selected from among a current packet to be multiplexed for transmission over the transmission channel in each of the encoded media streams at any given time. The prioritized packet is the packet which has the shortest decode delay from among all the current packets. The decode delay of a current packet is a difference between a current program clock reference (PCR) time and the DTS associated with the current packet.

Figure 4:
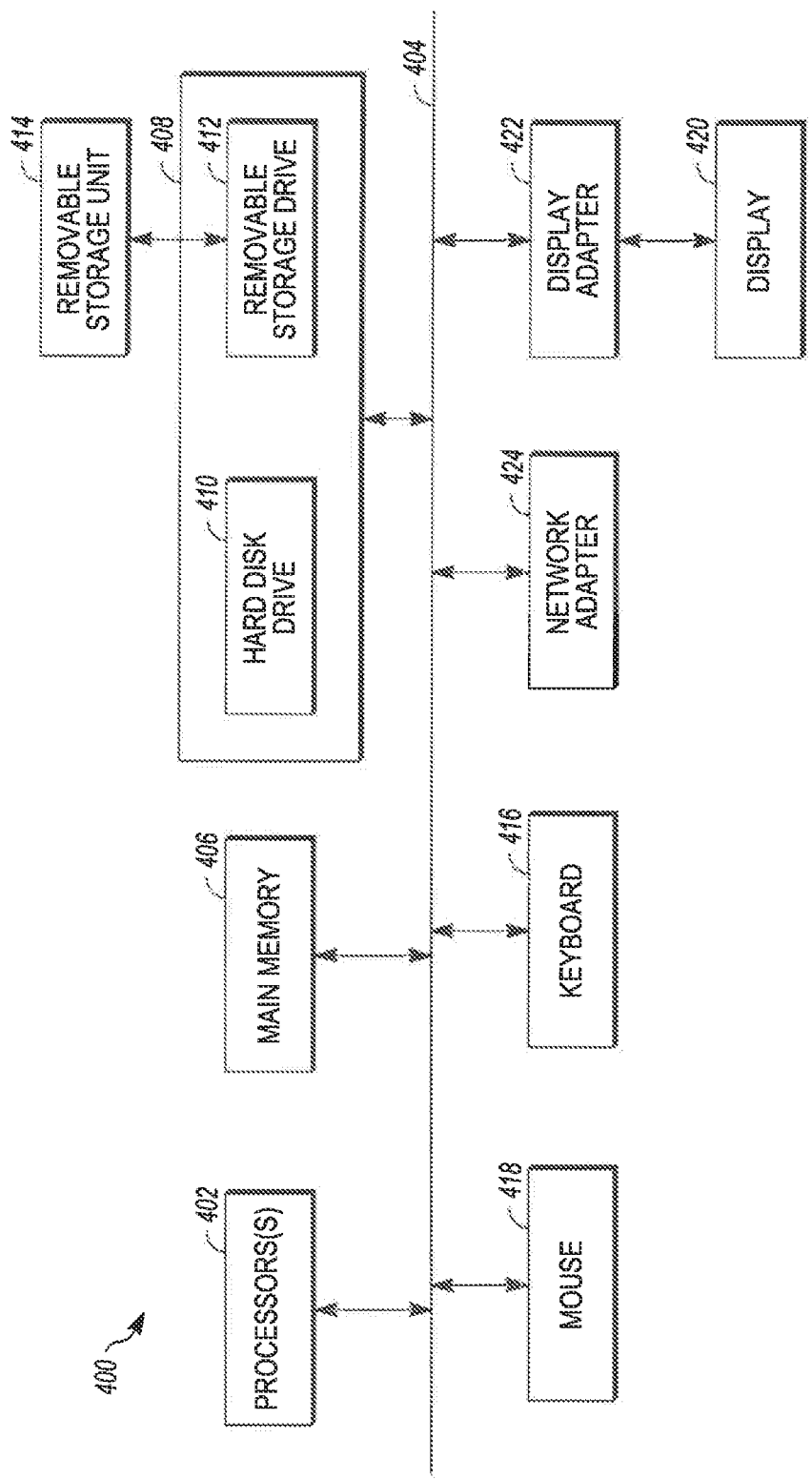
FIG. 4 illustrates a block diagram of one example of a computing apparatus that may be configured to implement or execute one or more of the processes performed by any of the various devices shown herein.

FIG. 4 illustrates a block diagram of one example of a computing apparatus 400 that may be configured to implement or execute one or more of the processes performed by any of the various devices shown herein, including but not limited to the encoders, multiplexers and decoders depicted herein. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, where a copy of the program code for one or more of the processes depicted in FIGS. 2-5 may be stored. The removable storage drive 412 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method for multiplexing encoded media streams into a statistically multiplexed media stream, comprising:
receiving over a communication network a plurality of encoded media streams each having a variable bit rate (VBR), the encoded media streams experiencing jitter while being transmitted over the communication network and undergoing a de-jitter process;
prior to multiplexing the encoded media streams into a multiplexed media stream, rearranging respective transmit times of select packets in select ones of the encoded media streams when a total group bandwidth available on a transmission channel over which the multiplexed media stream is to be transmitted is insufficient less than a sum of bandwidths of the encoded media streams because of the jitter and de jitter process experienced by the media streams, the rearranging being performed without exceeding a maximum bit rate at which each individual encoded media stream is configured, the rearranging causing the bandwidth of the multiplexed media stream to be less than or equal to the total group bandwidth of the transmission channel; and
after rearranging the transmit time of the select packets, multiplexing the encoded media steams into the multiplexed media stream and transmitting the multiplexed media stream onto the transmission channel.

2. The method of claim 1, wherein rearranging the transmit time of the select packets includes prioritizing transmission of certain packets over other packets based at least in part on a decode transmit time (DTS) associated with the packets.

3. The method of claim 2, wherein the select packets having rearranged transmit times include a prioritized packet that is selected to be multiplexed for transmission over the transmission channel in each of the encoded media streams at any given time, the prioritized packet having a shortest decode delay among all the current packets, the decode delay of a current packet being a difference between a current program clock reference (PCR) time and the DTS associated with the current packet.

4. The method of claim 1, wherein the communication network conforms to an Internet protocol.

5. The method of claim 1, further comprising monitoring a time interval between transmission of PCR timestamps in the multiplexed media stream.

6. The method of claim 5, further comprising inserting a PCR packet into the multiplexed media stream if the time interval being monitored will exceed a predetermined value, the PCR packet including a PCR timestamp but no data payload.

7. The method of claim 5, further comprising prioritizing a designated packet selected from among the current packets if the time interval being monitored will exceed a predetermined value and the designated packet includes a PCR timestamp even if the designated packet is not the current packet having the shortest decode delay.

8. A statistical multiplexer, comprising:
a plurality of encoders each configured to encode media streams at different bitrates, each of said media streams having associated therewith one or more need parameters reflecting a bit rate needed to transmit the respective media stream over a network at a given quality level;
a multiplexer for multiplexing each of the media streams to form a multiplexed media stream;
a communications network over which the encoders transmit the media streams to the multiplexer, the communications network conforming to a communication protocol that gives rise to packet jitter that is experienced by packets in the media streams;
a rate control processor for allocating bandwidth to each of the media streams based at least in part on the need parameter associated therewith so that a sum of bandwidths respectively allocated to the media streams is less than or equal to an available bandwidth on a transmission channel over which the multiplexer transmits the multiplexed media streams;
a de-jitter arrangement for reducing the packet jitter experienced by packets in the media streams being transmitted over the communication network to the multiplexer;
the multiplexer being configured to prevent the sum of the bandwidths of the media streams received by the multiplexer from exceeding the available bandwidth on the transmission channel as a result of the packet jitter arising the communication network by selectively delaying transmission of delayed packets and prioritizing transmission of other prioritized packets in individual ones of the media streams being multiplexed so that the total bandwidth of the multiplexed media stream does not exceed the available bandwidth of the transmission channel and also does not exceed a maximum bit rate at which each individual media stream is configured, wherein the prioritized packets are prioritized for transmission over the delayed packets that are delayed based at least in part on a decode time stamp (DTS) associated with the packets.

9. The statistical multiplexer of claim 8, herein prioritized packets and delayed packets are selected to be transmitted by the multiplexer in each of the media streams at any given time, a prioritized packet being a packet having a shortest decode delay, the decode delay of a current packet being a difference between a current program clock reference (PCR) time at the multiplexer and the DTS associated with the current packet.

10. The statistical multiplexer of claim 8, wherein the communication network conforms to an Internet protocol.

11. The statistical multiplexer of claim 8, wherein the jitter arrangement includes a phase-locked loop.

12. The statistical multiplexer of claim 9, wherein the multiplexer is further configured to monitor a time interval between transmission of PCR timestamps in the multiplexed media stream.

13. The statistical multiplexer of claim 12, wherein the multiplexer is further configured to insert a PCR packet into the multiplexed media stream if the time interval being monitored will exceed a predetermined value, the PCR packet including a PCR timestamp but no data payload.

14. The statistical multiplexer of claim 9, wherein the multiplexer is further configured to prioritize a designated packet selected from among the current packets if the time interval being monitored will exceed a predetermined value and the designated packet includes a PCR timestamp even if the designated packet is not the current packet having the shortest decode delay.

15. A statistical multiplexer, comprising:
- a plurality of encoders each configured to encode media streams at different bitrates, each of said media streams having associated therewith one or more need parameters reflecting a bit rate needed to transmit the respective media stream over a network at a given quality level;
- a multiplexer for multiplexing each of the media streams to form a multiplexed media stream;
- a communications network over which the encoders transmit the media streams to the multiplexer, the communications network conforming to a communication protocol that gives rise to packet jitter that is experienced by packets in the media streams;
- a rate control processor for allocating bandwidth to each of the media streams based at least in part on the need parameter associated therewith so that a sum of bandwidths respectively allocated to the media streams is less than or equal to an available bandwidth on a transmission channel over which the multiplexer transmits the multiplexed media streams;
- a de-jitter arrangement for reducing the packet jitter experienced by packets in the media streams being transmitted over the communication network to the multiplexer;
- the multiplexer including a processor and one or more computer readable media, the one or more computer readable media including instructions that, when executed by the processor, rearranges a transmit time of select packets in select ones of the media streams received over the communications network when a total group bandwidth available on the transmission channel over which the multiplexed media stream is to be transmitted is less than a sum of the bandwidths of the media streams because of the jitter and de-jitter process experienced by the media streams, the rearranging causing the bandwidth of the multiplexed media stream to be no greater than the total group bandwidth of the transmission channel without exceeding a maximum bit rate at which each individual media stream is configured.

16. The statistical multiplexer of claim 15, wherein rearranging the transmit time of the select packets includes prioritizing transmission of certain packets over other packets based at least in part on a decode transmit time (DTS) associated with the packets.

17. The statistical multiplexer of claim 16, wherein the select packets having rearranged transmit times include a prioritized packet that is selected to be multiplexed for transmission over the transmission channel in each of the encoded media streams at any given time, the prioritized packet having a shortest decode delay among all the current packets, the decode delay of a current packet being a difference between a current program clock reference (PCR) time and the DTS associated with the current packet.

18. The statistical multiplexer of claim 15, wherein the communication network conforms to an Internet protocol.

19. The statistical multiplexer of claim 15, further comprising monitoring a time interval between transmission of PCR timestamps in the multiplexed media stream.

20. The statistical multiplexer of claim 19, further comprising inserting a PCR packet into the multiplexed media stream if the time interval being monitored will exceed a predetermined value, the PCR packet including a PCR timestamp but no data payload.

* * * * *

UNITED STATES PATENT AND TRADEMARK OFFICE
CERTIFICATE OF CORRECTION

| | |
|---|---|
| PATENT NO. | : 11,057,653 B2 |
| APPLICATION NO. | : 16/228993 |
| DATED | : July 6, 2021 |
| INVENTOR(S) | : Robert S. Nemiroff and Jing Yang Chen |

It is certified that error appears in the above-identified patent and that said Letters Patent is hereby corrected as shown below:

In the Claims

Column 7, Claim 1, Lines 45 and 46: Remove "less than a sum of bandwidths of the encoded media streams".

Signed and Sealed this
Sixth Day of December, 2022

*Katherine Kelly Vidal*

Katherine Kelly Vidal
*Director of the United States Patent and Trademark Office*